US009310648B2

United States Patent
Cho et al.

(10) Patent No.: US 9,310,648 B2
(45) Date of Patent: Apr. 12, 2016

(54) LIQUID CRYSTAL PANEL ASSEMBLY AND LIQUID CRYSTAL DISPLAY APPARATUS

(75) Inventors: Byoung-jin Cho, Anyang-si (KR); Young-chol Lee, Hwaseong-si (KR); Jun-seok An, Daegu (KR); Nae-won Jang, Suwon-si (KR); Myung-ryul Jung, Hwaseong-si (KR); Hyeong-sik Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 4 days.

(21) Appl. No.: 13/556,428

(22) Filed: Jul. 24, 2012

(65) Prior Publication Data
US 2013/0114020 A1 May 9, 2013

(30) Foreign Application Priority Data

Nov. 9, 2011 (KR) ........................ 10-2011-0116311

(51) Int. Cl.
*G02F 1/1333* (2006.01)
*G02F 1/1335* (2006.01)
*F21V 8/00* (2006.01)

(52) U.S. Cl.
CPC ........ *G02F 1/133615* (2013.01); *G02B 6/0096* (2013.01)

(58) Field of Classification Search
CPC ................... G02F 1/133615; G02F 1/133605; G02F 1/133603; G02F 1/133611; G02F 1/13353; G02B 6/0055; G02B 6/0031; G02B 6/0096
USPC .......................... 349/58, 65, 67; 362/600–632
See application file for complete search history.

(56) References Cited

U.S. PATENT DOCUMENTS

| 5,396,406 A * | 3/1995 | Ketchpel .......................... 362/27 |
| 7,220,045 B2 * | 5/2007 | Chang ............................ 362/633 |
| 7,229,198 B2 * | 6/2007 | Sakai et al. ..................... 362/560 |
| 7,322,731 B2 * | 1/2008 | Epstein et al. ................ 362/609 |

(Continued)

FOREIGN PATENT DOCUMENTS

| EP | 1653149 A1 | 5/2006 |
| EP | 2317351 A2 | 5/2011 |

OTHER PUBLICATIONS

Communication dated Jan. 17, 2013, issued by the European Patent Office in counterpart European Patent Application No. 12185956.5.

(Continued)

*Primary Examiner* — Edward Glick
*Assistant Examiner* — David Chung
(74) *Attorney, Agent, or Firm* — Sughrue Mion, PLLC

(57) ABSTRACT

Provided are a liquid crystal panel assembly having no light guide plate (LGP) and a liquid crystal display apparatus. The liquid crystal panel assembly includes: a light source which generates light; a liquid crystal panel which displays the light generated from the light source as an image; at least one optical film disposed at a rear of the liquid crystal panel; a reflector sheet which is disposed at a rear of the optical film and reflects the light from the light source toward the optical film; a reflector which concentrates the light from the light source; an upper chassis and a lower chassis which house the light source, the liquid crystal panel, the optical film, the reflector sheet, and the reflector therebetween; and a middle chassis installed between the upper chassis and the lower chassis, wherein the reflector and the middle chassis form a single body.

12 Claims, 3 Drawing Sheets

(56) References Cited

U.S. PATENT DOCUMENTS

| | | | |
|---|---|---|---|
| 7,600,908 B2* | 10/2009 | Chang | F21V 29/004 |
| | | | 361/703 |
| 7,663,712 B2* | 2/2010 | Lee | 349/64 |
| 8,876,348 B2* | 11/2014 | Kelly | F21V 3/0463 |
| | | | 362/601 |
| 2003/0223215 A1* | 12/2003 | Shin et al. | 362/27 |
| 2007/0014126 A1 | 1/2007 | Kuo et al. | |
| 2007/0097284 A1* | 5/2007 | Ho et al. | 349/58 |
| 2007/0171676 A1* | 7/2007 | Chang | 362/613 |
| 2008/0192507 A1 | 8/2008 | Chang | |
| 2010/0134722 A1* | 6/2010 | Huang | G02B 6/0031 |
| | | | 349/65 |
| 2011/0090422 A1 | 4/2011 | Hamada | |
| 2011/0211335 A1 | 9/2011 | Ko | |
| 2011/0222267 A1 | 9/2011 | Park et al. | |
| 2012/0281151 A1* | 11/2012 | Abe | 348/739 |
| 2013/0114023 A1* | 5/2013 | Cho | G02F 1/133615 |
| | | | 349/65 |

OTHER PUBLICATIONS

Communication dated Jun. 10, 2015, issued by the European Patent Office in counterpart European Patent Application No. 12185956.5.

Communication dated Dec. 15, 2015, issued by the European Patent Office in counterpart European Application No. 12185956.5.

* cited by examiner

LIQUID CRYSTAL PANEL ASSEMBLY AND LIQUID CRYSTAL DISPLAY APPARATUS

CROSS-REFERENCE TO RELATED APPLICATION

This application claims priority from Korean Patent Application No. 10-2011-0116311, filed on Nov. 9, 2011, in the Korean Intellectual Property Office, the disclosure of which is incorporated herein by reference in its entirety.

BACKGROUND

1. Field

Apparatuses consistent with exemplary embodiments relate to a liquid crystal panel assembly and a liquid crystal display apparatus including the same, and more particularly, to a liquid crystal panel assembly not having a light guide plate (LGP) and a liquid crystal display apparatus including the same.

2. Description of the Related Art

A liquid crystal display apparatus is an apparatus which realizes an image by using a liquid crystal and is applied to various types of display apparatuses such as a television (TV), a computer monitor, etc.

A general liquid crystal display apparatus includes a liquid crystal panel which displays light as an image, a light source which provides the light to the liquid crystal panel, and a light guide panel (LGP) which guides the light generated from the light source to the liquid crystal panel.

A liquid crystal display apparatus from which a LGP is omitted has been developed for a cost reduction and a light weight. In the liquid crystal display apparatus from which the LGP is omitted, an emission angle of light emitted from a light source is reduced by using a lens or a reflector to transmit the light to a side opposite to the light source without the LGP.

However, the liquid crystal display apparatus from which the LGP is omitted additionally includes subordinate apparatuses such as the lens, the reflectors, etc. Therefore, a thickness of the liquid crystal panel and a width of a bezel increase, and a work for installing the lens or the reflector is additionally required, thereby lowering work efficiency.

Accordingly, there is desired a method of providing a light concentrating function, reducing a thickness of a liquid crystal panel or a width of a bezel, and improving a manufacturing process if an LGP is omitted from a liquid crystal display apparatus.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a liquid crystal panel assembly having a light concentrating function and an improved manufacturing process and a liquid crystal display apparatus including the liquid crystal panel assembly.

According to an aspect of an exemplary embodiment, there is provided a liquid crystal panel assembly having no light guide plate (LGP). The liquid crystal panel assembly may include: a light source which generates light; a liquid crystal panel which displays the light generated from the light source as an image; at least one optical film which is disposed at a rear of the liquid crystal panel to face the liquid crystal panel; a reflector sheet which is disposed at a rear of the optical film and reflects the light generated from the light source toward the optical film; a reflector which concentrates the light generated from the light source; an upper chassis and a lower chassis which house the light source, the liquid crystal panel, the optical film, the reflector sheet, and the reflector therebetween; and a middle chassis which is installed between the upper chassis and the lower chassis, wherein the reflector and the middle chassis form a single body The middle chassis may be installed so that the reflector supports an upper side of the light source The liquid crystal panel assembly may further include: a support reflector which concentrates the light generated from the light source and is disposed to support a lower side of the light source.

The support reflector may be installed on the reflector sheet.

Each of the reflector and the support reflector may be one of an elliptical mirror, a parabolic mirror, a spherical lens, and an aspheric lens.

The reflector and the support reflector may be symmetrically installed on and underneath the light source, respectively, such that the light source is held between the reflector and the support reflector.

The light source may be a light-emitting diode (LED).

The at least one optical film may include a prism sheet.

According to an aspect of another exemplary embodiment, there is provided a liquid crystal display apparatus including the liquid crystal panel assembly.

As described above, according to exemplary embodiments, in the liquid crystal panel assembly and the liquid crystal display apparatus including the liquid crystal panel assembly, the reflector may be formed at the middle chassis to form a single body along with the middle chassis. Therefore, the liquid crystal display panel and the liquid crystal display apparatus may have light concentrating functions, reduce a thickness of a panel or a width of a bezel, and improve efficiencies of their manufacturing processes.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other exemplary aspects will be more apparent by describing in detail exemplary embodiments, with reference to the accompanying drawings, in which.

DETAILED DESCRIPTION OF THE EXEMPLARY EMBODIMENTS

Figure 1:
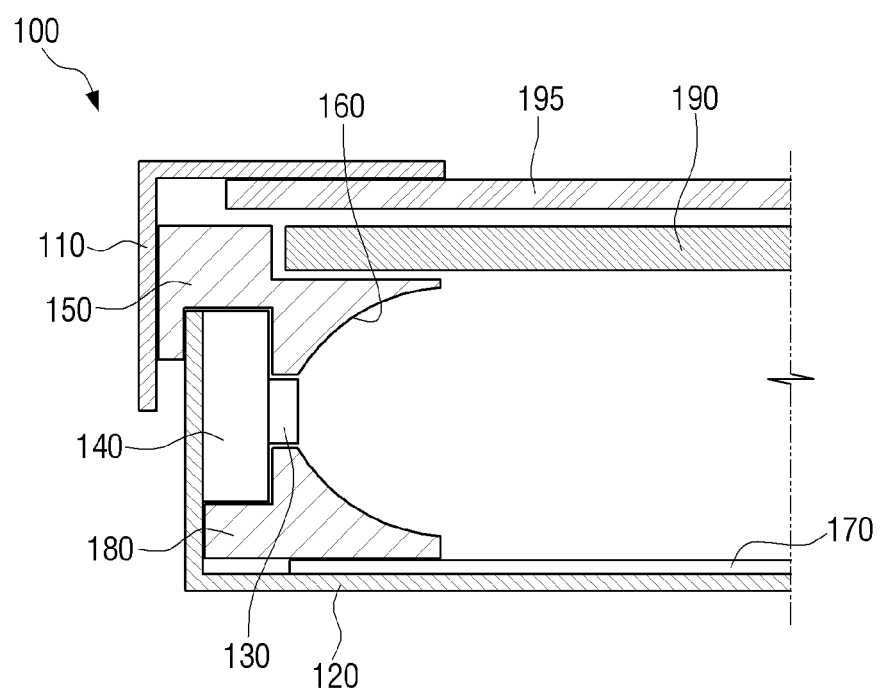
FIG. 1 is a partial cross-sectional view illustrating a liquid crystal panel assembly according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a partial cross-sectional view illustrating a liquid crystal panel assembly 100 according to an exemplary embodiment.

Referring to FIG. 1, the liquid crystal panel assembly 100 includes an upper chassis 110 and a lower chassis 120.

The upper chassis 110 and the lower chassis 120 are attached to each other through a screw or another device for attachment to form a space which houses other parts of the liquid crystal panel assembly 10.

A reflector sheet 170 is installed on the lower chassis 120.

The liquid crystal panel assembly 100 further includes a middle chassis 150 which is also referred to as a middle mold.

The middle chassis 150, the upper chassis 110, and the lower chassis 120 support some parts of the liquid crystal panel assembly 110. For this purpose, the middle chassis 150 is disposed at an edge area in the liquid crystal panel assembly 100 and between the upper chassis 110 and the lower chassis 120.

The liquid crystal panel assembly 100 further includes a light source 130.

The light source 130 generates light and may be one or more light-emitting diodes (LEDs) in the present exemplary embodiment. According to other exemplary embodiments, other types of light sources may be used as the light source 130. Only one light source 130 is shown in FIG. 1, but the liquid crystal panel assembly 100 may include a plurality of light sources 130 which may be disposed at equal intervals. The light source 130 is installed on a driving substrate 140 which is installed on the lower chassis 120.

The liquid crystal panel assembly 100 further includes a reflector 160. The reflector 160 concentrates the light emitted from the light source 130 and refracts the light at several angles to direct the light toward the reflector sheet 170. As shown in FIG. 1, the liquid crystal panel assembly 100 does not include a light guide panel (LGP). In come liquid crystal panel assemblies, a LGP guides light emitted from a light source toward a liquid crystal panel. The liquid crystal panel assembly 100 according to the present exemplary embodiment includes the reflector 160 without any LGP. Therefore, the reflector 160 directs the light, which is emitted from the light source 130, far away from the light source 130. The liquid crystal panel assembly 100 according to the present exemplary embodiment omits the LGP and thus may reduce manufacturing cost and a weight more than a general liquid crystal panel having an LGP.

The reflector 160 may be at least one of an elliptical mirror, a parabolic mirror, a spherical lens, and an aspheric lens.

The reflector 160 forms a single body with the middle chassis 150 to support an upper part of the light source 130. Therefore, in the liquid crystal panel assembly 100 according to the present exemplary embodiment, the reflector 160 is not separate from the middle chassis 150. As a result, a process of manufacturing the liquid crystal panel assembly 100 is improved, a thickness of the liquid crystal panel assembly 100 slims, and a material cost is reduced.

The liquid crystal panel assembly 100 further includes a support reflector 180 which is installed underneath the light source 130.

Like the reflector 160, the support reflector 180 concentrates the light emitted from the light source 130 to direct the light toward the reflector sheet 170.

Like the reflector 160, the support reflector 180 may be at least one of an elliptical mirror, a parabolic mirror, a spherical lens, and an aspheric lens.

The support reflector 180 is installed on the reflector sheet 170 to support a lower part of the light source 130. Therefore, the reflector 160 and the support reflector 180 are symmetrically installed over and underneath the light source 130, respectively, to enclose the light source 130. In the present exemplary embodiment, the reflector 160 and the support reflector 180 are installed to support the light source 130 therebetween. Therefore, when the light source 130 and the lower chassis 120 of the driving substrate 140 are installed, an additional fixing means, such as a screw or the like, is not required to fix the light source 130 and the lower chassis 120.

Operations of the reflector 160 and the support reflector 180 will now be described. The reflector 160 and the support reflector 180 collimate the light emitted from the light source 130 and reduce an emission angle of the light emitted from the light source 130 by using a curvature to concentrate the light.

The liquid crystal panel assembly 100 further includes an optical film 190 and a liquid crystal panel 195.

The optical film 190 is disposed at the rear of the liquid crystal panel 195 to face the liquid crystal panel 195. The optical film 190 is shown as a single member in FIG. 1 but may include a plurality of optical sheets such as a diffuser sheet, a prism sheet, etc. The optical film 190 has an approximately rectangular shape.

The liquid crystal panel 195 displays the light generated from the light source 130 as a color image. For this purpose, the liquid crystal panel 195 includes a color filter substrate (not shown) having a color filter layer and a thin film transistor (TFT) substrate (not shown) having a TFT. A liquid crystal (not shown) is housed between the color filter substrate and the TFT substrate. The liquid crystal panel 195 is well known, and thus its detailed description will be omitted.

Figure 2:
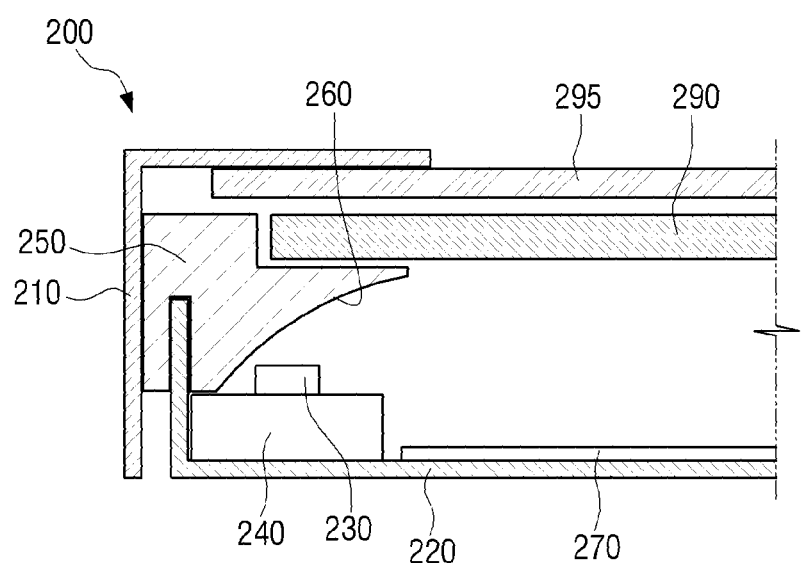
FIG. 2 is a partial cross-sectional view illustrating a liquid crystal panel assembly according to another exemplary embodiment.

FIG. 2 is a partial cross-sectional view illustrating a liquid crystal panel assembly 200 according to another exemplary embodiment.

Referring to FIG. 2, the liquid crystal panel assembly 200 is similar to the liquid crystal panel assembly 100 of the previous exemplary embodiment. For example, an optical film 290 and a liquid crystal panel 295 of the liquid crystal panel assembly 200 are the same as the optical film 190 and the liquid crystal panel 195 of the liquid crystal panel assembly 100. Therefore, theses parts of the liquid crystal panel assembly 200 will not be repeatedly described.

The liquid crystal panel assembly 200 according to the present exemplary embodiment includes an upper chassis 210 and a lower chassis 220.

The upper chassis 210 and the lower chassis 220 may be attached to each other so that a side part of the upper chassis 210 approximately encloses a side part of the lower chassis 220.

A middle chassis 250 is installed between the upper chassis 210 and the lower chassis 220.

A light source 230 and a driving substrate 240 are installed on the lower chassis 220 to be close to an end of the side part of the lower chassis 220. A reflector sheet 270 is installed close to the driving substrate 240.

The light source 230 is disposed to emit light upwards, toward a side of a rear surface of the optical film 290 and the liquid crystal panel 295.

As described in the previous exemplary embodiment, a reflector 260 is formed with the middle chassis 250 as a single body. Also, the middle chassis 250 is installed so that a curved surface of the reflector 260 is disposed above the light source 230.

An operation of the reflector 260 of the present exemplary embodiment will now be described. The reflector 260 collimates the light emitted from the light source 230 through the curved surface (an effective reflective surface) and reduces an emission angle of the light emitted from the light source 230 by using a curvature to concentrate the light.

Differently from the liquid crystal panel assembly 100 of the previous exemplary embodiment, the liquid crystal panel assembly 200 according to the present exemplary embodiment does not include an additional support reflector. Therefore, a thickness of the liquid crystal panel assembly 200 may slim, and manufacturing process and cost may be reduced.

Also, the reflector 260 may support the light source 230 as described in the previous exemplary embodiment.

Figure 3:
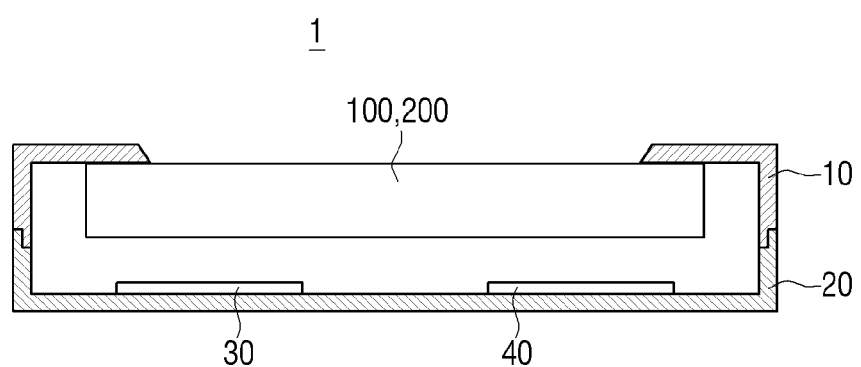
FIG. 3 is a schematic cross-sectional view illustrating a liquid crystal display apparatus according to an exemplary embodiment.

FIG. 3 is a schematic cross-sectional view illustrating a liquid crystal display apparatus 1 according to an exemplary embodiment.

The liquid crystal display apparatus 1 of FIG. 3 may be a liquid crystal display television (LCD TV). However, it will be understood by those of ordinary skill in the art that other types of display apparatuses, such as a computer monitor, etc., may be used as the liquid crystal display apparatus 1.

Referring to FIG. 3, the liquid crystal display apparatus 1 includes an upper housing 10 and a lower housing 20. The upper and lower housings 10 and 20 house one of the liquid crystal panel assemblies 100 and 200 of the previous exemplary embodiments.

A power board 30 and a control board 40 are disposed in the rear of the liquid crystal panel assembly 100 or 200. The power board 30 supplies a voltage to the liquid crystal display apparatus 1, and the control board 40 controls an operation of the liquid crystal display apparatus 1. The power board 30 and the control board 40 are shown in FIG. 3, but other circuit boards may be additionally installed in the liquid crystal display apparatus 1.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A liquid crystal panel assembly comprising:
   a light source which generates light;
   a liquid crystal panel which displays the light generated from the light source as an image;
   at least one optical film which is disposed at a rear of the liquid crystal panel;
   a reflector sheet which is disposed at a rear of the optical film and reflects the light generated by the light source toward the optical film;
   a reflector which concentrates the light generated by the light source;
   an upper chassis and a lower chassis which house the light source, the liquid crystal panel, the optical film, the reflector sheet, and the reflector therebetween; and
   a middle chassis which is separate and distinct from the upper chassis and the lower chassis, and is installed between the upper chassis and the lower chassis,
   wherein the reflector and the middle chassis together form a single body, and
   wherein the reflector, the light source and a support reflector cooperatively form a substantially smooth parabolic surface.

2. The liquid crystal panel assembly as claimed in claim 1, wherein the reflector supports an upper side of the light source.

3. The liquid crystal panel assembly as claimed in claim 1, wherein the light source is a light-emitting diode (LED).

4. The liquid crystal panel assembly as claimed in claim 1, wherein the at least one optical film comprises a prism sheet.

5. A liquid crystal display apparatus comprising the liquid crystal panel assembly as claimed in claim 1.

6. The liquid crystal panel assembly as claimed in claim 2, wherein the support reflector concentrates the light generated from the light source and supports a lower side of the light source.

7. The liquid crystal display assembly of claim 1, wherein the reflector is configured to concentrate light emitted from the light source and refract light at multiple angles toward the reflector sheet.

8. The liquid crystal display panel assembly of claim 1, further comprising a fastener configured to attach the upper chassis to the lower chassis.

9. The liquid crystal display panel assembly of claim 1, wherein the reflector sheet comprises a surface that is disposed along a direction that is in parallel to a surface of the optical film.

10. The liquid crystal panel assembly as claimed in claim 6, wherein the support reflector is installed on the reflector sheet.

11. The liquid crystal panel assembly as claimed in claim 6, wherein the support reflector is one of an elliptical and a parabolic mirror.

12. The liquid crystal panel assembly as claimed in claim 10, wherein the reflector and the support reflector are symmetrically installed over and underneath the light source, respectively, such that the light source is held between the reflector and the support reflector.

* * * * *